United States Patent
Rotter et al.

(10) Patent No.: US 11,660,830 B2
(45) Date of Patent: May 30, 2023

(54) CONTOURED COMPOSITE STRINGERS

(71) Applicant: The Boeing Company, Chicago, IL (US)

(72) Inventors: Daniel Rotter, Lake Forest Park, WA (US); Lisa Carlson, Auburn, WA (US); Brad Andrew Coxon, Everett, WA (US); Hyukbong Kwon, Marysville, WA (US); Khanh Mai Pham, Renton, WA (US); Darrell D. Jones, Mill Creek, WA (US); Brian Robins, Renton, WA (US)

(73) Assignee: The Boeing Company, Chicago, IL (US)

( * ) Notice: Subject to any disclaimer, the term of this patent is extended or adjusted under 35 U.S.C. 154(b) by 1162 days.

(21) Appl. No.: 16/252,260

(22) Filed: Jan. 18, 2019

(65) Prior Publication Data

US 2020/0231267 A1    Jul. 23, 2020

(51) Int. Cl.
*B29C 70/46* (2006.01)
*B64F 5/10* (2017.01)
(Continued)

(52) U.S. Cl.
CPC ............ *B29C 70/462* (2013.01); *B29C 70/02* (2013.01); *B29D 99/0003* (2013.01);
(Continued)

(58) Field of Classification Search
CPC ... B64C 1/064; B64C 1/12; B64C 2001/0072; B64C 3/182; B29C 70/02; B29C 33/308;
(Continued)

(56) References Cited

U.S. PATENT DOCUMENTS 8,465,613 B2   6/2013   Rotter et al.
9,561,602 B2   2/2017   Jones et al.
(Continued)

FOREIGN PATENT DOCUMENTS

EP   2133263 A2   12/2009
EP   2133263 A3   11/2011
EP   3115185 A1   1/2017

OTHER PUBLICATIONS

European Patent Office, Extended European Search Report regarding European Patent Application No. 20152192.9, dated Oct. 19, 2020, 14 pages.
(Continued)

*Primary Examiner* — Brian Handville
(74) *Attorney, Agent, or Firm* — Kolisch Hartwell, P.C.

(57) ABSTRACT

Aircraft that incorporates a rounded-hat composite stringer connected to an inner side of the skin of the aircraft to form an elongate conduit that defines a conduit axis, where the conduit axis includes at least one curving portion. The rounded-hat composite stringer can be manufactured by constructing a lower forming die and an upper forming die, each forming die having a length and defining a curve along at least a portion of the length of the die, cutting a pre-cured flat composite charge dimensioned to form the rounded-hat composite stringer, pressing the flat composite charge between the lower and upper forming dies to shape the composite charge into a pre-formed stringer having an inner side between curved fillet portions, contacting a forming member against the inner side of the pre-formed stringer, applying radius fillers to the curved fillet portions of the pre-formed stringer, curing the pre-formed stringer, and removing the forming member from the cured stringer.

20 Claims, 7 Drawing Sheets

(51) Int. Cl.
*B29C 70/02* (2006.01)
*B64C 1/06* (2006.01)
*B64C 1/12* (2006.01)
*B29D 99/00* (2010.01)
B29K 307/04 (2006.01)
B29L 31/30 (2006.01)

(52) U.S. Cl.
CPC .............. *B64C 1/064* (2013.01); *B64C 1/12* (2013.01); *B64F 5/10* (2017.01); *B29K 2307/04* (2013.01); *B29L 2031/3076* (2013.01)

(58) Field of Classification Search
CPC ... B29C 33/505; B29C 70/446; B29C 70/462; B29C 2793/0081; B29C 33/405; B29C 69/001; B64F 5/10; B29K 2307/04; B29L 2031/3076; B29L 2031/3082; B29L 2031/3085; B29D 99/0003; Y02T 50/40
See application file for complete search history.

(56) References Cited

U.S. PATENT DOCUMENTS

| | | |
|---|---|---|
| 9,649,817 B2 | 5/2017 | Robins et al. |
| 9,931,807 B2 | 4/2018 | Stewart |
| 2008/0290214 A1 | 11/2008 | Guzman et al. |
| 2009/0320292 A1* | 12/2009 | Brennan ............... B29C 70/446 29/897.2 |
| 2009/0320995 A1* | 12/2009 | Menendez Martin ....................... B29C 70/345 156/201 |
| 2011/0315824 A1 | 12/2011 | Pook et al. |
| 2013/0316147 A1* | 11/2013 | Douglas ............. B29D 99/0003 156/60 |
| 2015/0246718 A1* | 9/2015 | Aitken ............... B29D 99/0007 29/700 |
| 2016/0332413 A1* | 11/2016 | Kismarton ........... B29C 70/304 |
| 2017/0008217 A1* | 1/2017 | Chapman ................ B29C 51/12 |
| 2017/0057100 A1 | 3/2017 | Shaw et al. |

OTHER PUBLICATIONS

European Patent Office, Partial Extended European Search Report regarding European Patent Application No. 20152192.9, dated Jun. 9, 2020, 13 pages.
European Patent Office, Examination Report regarding European Patent Application No. 20152192.9, dated Jan. 5, 2023, 7 pages.

* cited by examiner

CONTOURED COMPOSITE STRINGERS

FIELD

This disclosure relates to aircraft structure, and more specifically the disclosure relates to rounded-hat composite stringers that define a curving conduit along an inner side of an aircraft skin.

INTRODUCTION

Aircraft generally include an airframe to which skin panels are attached in order to form a smooth aerodynamic outer surface. The skin panels are typically thin and light in order to minimize weight, and so can be somewhat flexible. In order to stiffen the panels and provide additional reinforcement, hat stringers are generally applied to fuselage sections and wing skins. Hat stringers have typically been formed of thin metal formed into the acute angles that confer stiffness and strength to the skin panels to which they are attached.

More recently, composite materials have been employed to form numerous aircraft components, due to possessing enhanced strength and stiffness while remaining light in weight, including composite materials prepared using organic polymeric materials and epoxy resins. As stringers for aircraft began to be manufactured using composite materials, the shape of the stringers evolved. Stiff metallic stringers having straight legs and acute angles have been replaced for example by stringers having a trapezoidal cross-section, either formed by a solid composite material, or defining an internal passage for the flow of liquids.

Such composite stringers, however, can require multiple plies of material to be layered by hand, either using a forming mandrel, vacuum hot drape forming, or similar technique. Forming stringers ply by ply is time-intensive, labor-intensive, and increases the risk of repetitive injury. Wrinkles may form in the ply during application, and consistency in size and thickness can be problematic. Trapezoidal hat stringers can also exhibit deficiencies related to radius thinning/thickening, Barely Visible Impact Damage (BVID), and internal fuel flow.

SUMMARY

The present disclosure provides rounded-hat composite stringers, aircraft that incorporate rounded-hat composite stringers, and methods of manufacturing rounded-hat composite stringers.

In some embodiments, the disclosure may provide an aircraft that includes a skin portion having an inner side, and a rounded-hat composite stringer connected to the inner side of the skin portion, so that in combination with the skin portion the composite stringer forms an elongate conduit having a conduit axis, where the conduit axis includes at least one curving portion.

In some embodiments, the disclosure may provide methods of manufacturing rounded-hat composite stringers, the methods including constructing a lower forming die and an upper forming die, each forming die having a length and defining a curve along at least a portion of the length of the die; cutting a pre-cured flat composite charge dimensioned to form a rounded-hat composite stringer; pressing the flat composite charge between the lower and upper forming dies to shape the composite charge into a pre-formed stringer, where the resulting pre-formed stringer has an inner side between curved fillet portions; contacting a forming member against the inner side of the pre-formed stringer; applying radius fillers to the curved fillet portions of the pre-formed stringer; curing the pre-formed stringer; and removing the forming member from the cured stringer.

In some embodiments, the disclosure may provide methods of manufacturing a complex-contoured rounded-hat composite stringer, the method including cutting a two-dimensional elongate piece from a flat composite charge so that the elongate piece has at least two curved edges, pressing the elongate piece between upper and lower forming dies to form a curved pre-formed stringer having a rounded-hat-shaped cross-section, and curing the resulting pre-formed stringer.

The disclosed features, functions, and advantages of the disclosed composite stringers, aircraft, and methods may be achieved independently in various embodiments of the present disclosure, or may be combined in yet other embodiments, further details of which can be seen with reference to the following description and drawings.

DESCRIPTION

Various aspects and examples of composite material stringers and methods for their manufacture are described below and illustrated in the associated drawings. Unless otherwise specified, the disclosed apparatus and/or their various components may, but are not required to, contain one or more of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments will necessarily provide the same advantages or the same degree of advantages.

Figure 1:
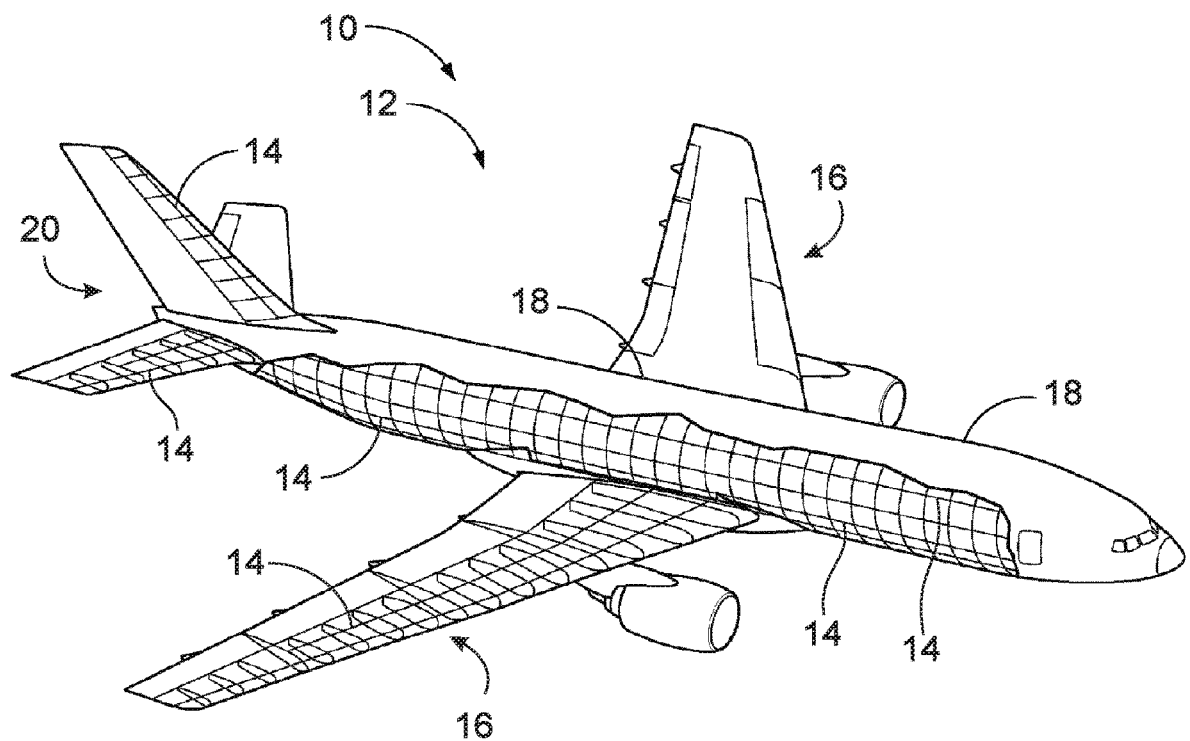
FIG. 1 is a partial cut-away view of an illustrative example of an aircraft that incorporates one or more stiffened composite structures.

FIG. 1 depicts an illustrative example of an apparatus 10 that may incorporate rounded-hat composite stringers as provided in the present disclosure to strengthen and/or stiffen the apparatus construction. Apparatus 10 may correspond to an aircraft 12, and may incorporate a plurality of rounded-hat composite stringers 14 throughout the aircraft, including but not limited to wing structures 16, fuselage structures 18, or empennage structures 20 (i.e. the tail assembly) of aircraft 12.

Although the present disclosure specifically relates to the use of rounded-hat composite stringers in aircraft manufacture, a variety of other apparatus 10 are within the scope of the present disclosure, and the present disclosure is not limited to aircraft and aircraft applications. For example, as illustrative, non-exclusive examples, other apparatus 10 that may include rounded-hat composite stringers 14 include (but are not limited to) spacecraft, watercraft, land vehicles, wind turbines, structural towers and masts, roofing material, and the like. Additionally, where apparatus 10 includes an aircraft, the aircraft may be any version or variation of aircraft that can benefit from incorporating the rounded-hat composite stringers 14, such as commercial aircraft, military aircraft, private aircraft, or any other suitable aircraft. While FIG. 1 illustrates aircraft 12 in the form of a fixed wing aircraft, other types and configurations of aircraft are within the scope of aircraft 12 according to the present disclosure, including (but not limited to) helicopters.

Apparatus 10 generally includes a structure that can incorporate one or more rounded-hat composite stringers 14 associated with an inner surface of a portion of a skin of the apparatus. Where apparatus 10 includes aircraft 12, the rounded-hat composite stringers are then typically associated with an inner surface of a portion of the skin of the aircraft. Although typically associated with skin portions, the rounded-hat composite stringers of the disclosure may alternatively or in addition be utilized in association with any other suitable structural element of apparatus 10, such as for example a wall, a floor, a frame, a column, and the like.

Figure 2:
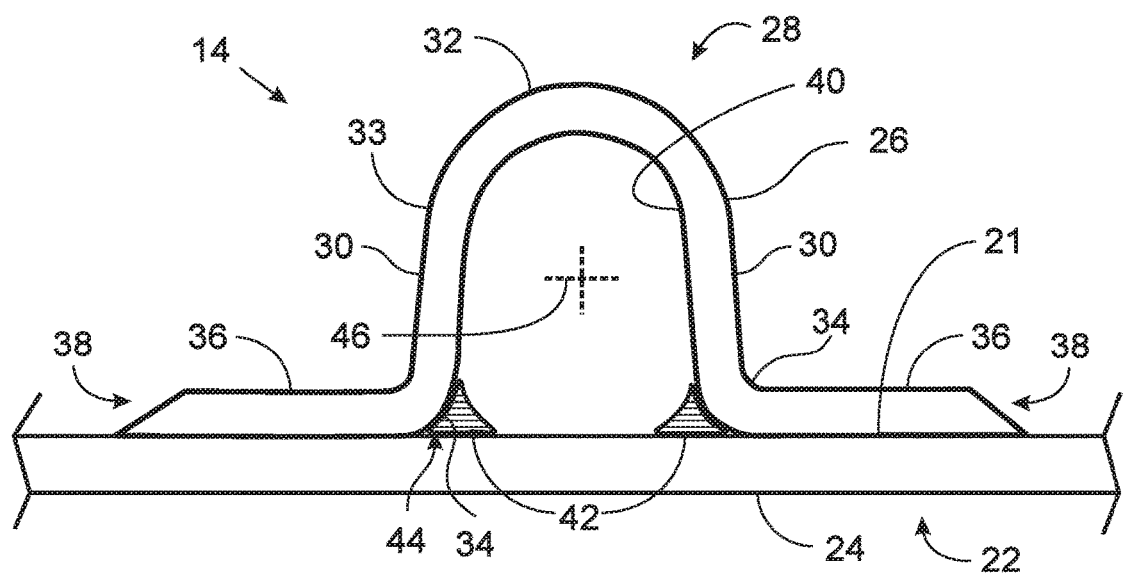
FIG. 2 semi-schematically depicts a cross-section of an illustrative rounded-hat composite stringer coupled to a base, according to an aspect of the present disclosure.

FIG. 2 depicts a cross-sectional view of a representative rounded-hat composite stringer 14. Stringer 14 is associated with a surface 21 of a base 22. Base 22 can be a composite panel that is applied to stringer 14 to form a complete stringer assembly. Alternatively, surface 21 is an inner surface of a base that is a skin portion 24 of apparatus 10. Where stringer 14 is associated with skin portion 24, stringer 14 provides support to, increases the strength of, and enhances the stiffness of skin portion 24.

Stringer 14 can include one or more plies of a composite material that form a body 26 of the stringer. Body 26 of stringer 14 defines a central ridge 28 that protrudes and/or extends in an inboard direction with respect to base 22, and which extends substantially and/or completely along the longitudinal length of stringer 14. Central ridge 28 generally is centered with respect to the lateral dimension (width) of stringer 14. The shape of central ridge 28 is configured to stiffen the overall composite structure, relative to a similar composite structure lacking any longitudinal ridge. Composite stringer 14 can therefore be described as stiffened even when the stringer structure is in a pliable state, such as when the stringer structure is uncured and/or partially cured.

Central ridge 28 includes sidewalls 30 and a rounded hat portion 32 supported by sidewalls 30. Rounded hat portion 32 transitions to a straight sidewall 30 at tangent points 33, and then sidewalls 30 extend downwardly in a straight line until transitioning at a smooth but narrow radius curve 34 to stringer legs 36, which extend laterally outward along surface 21. Curve 34 corresponds to a smooth fillet portion that is devoid of any sharp turns or inflection points, and legs 36 extend from curve 34 to each side of stringer 14 to form longitudinal flanges. The continuous curvature from stringer sidewall 30 to stringer leg 36 serves to minimize or eliminate any potential for ply breakage, separation from a main body of filler (e.g., woven fabric or tape) and also to minimize excess resin accumulation.

Legs 36 can end in tapered portions 38 in order to provide a smooth transition from stringer 14 to surface 21 of base 22 when stringer 14 is associated with surface 21. Legs 36 additionally serve as flanges to seal stringer 14 to surface 21 of base 22, either by co-curing and consolidation, or with an adhesive suitable for use with the composite material making up stringer 14 and the material of base 22.

Sidewalls 30, rounded hat portion 32, and surface 21 of base 22, when considered in combination, form an elongate internal conduit 40 that extends beneath/within the length of stringer 14 as it extends longitudinally along base 22. The cross-sectional shape of conduit 40 defines an elongate internal space suitable for the flow of fluids within stringer 14. Stringer 14 can further include a pair of elongate radius fillers 42 that similarly extend longitudinally along the length of the stringer, and which are configured to be inserted into the niches 44 formed where each curve 34 transitions from sidewall 30 to leg 36 along surface 21. As shown in FIG. 2, radius fillers 42 in combination with stringer 14 and surface 21 create the smooth cross-sectional profile of conduit 40, which in turn permits the transport of fluids within stringer 14 with smooth flow and minimal turbulence. In one aspect of the present disclosure, stringer 14 is well-suited for the transport of fluids, such as but not limited to, jet fuel.

Conduit 40 defines an internal conduit axis 46 which is substantially centered within and aligned with elongate internal conduit 40. That is, as stringer 14 extends along surface 21 of base 22, conduit axis 46 similarly extends along the path of conduit 40, and therefore along the path formed by stringer 14 on base 22.

As is the case with previous stringers, the composite stringers 14 of the present disclosure may incorporate one or more joggles, corresponding to two bends in the stringer that are opposite each other and relatively close to each other. However, due to their composition and their method of manufacture, the composite stringers of the present disclosure provide exceptional flexibility in conforming to a desired curve profile, unlike previous types of stringers, including previous composite stringers. Typically, the composite stringers of the present disclosure are configured so that elongate internal conduit 40 defines a path that includes at least one curving portion.

Where the stringer path for a stringer of the present disclosure includes a curving portion, that curving portion can correspond to a simple curve, having a fixed radius. A simple curve is also a curve that can be completely defined without leaving a two-dimensional plane. The composite stringers of the present disclosure may also be configured to follow a path that includes a curving portion including a compound curve, or a curve having two or more arc sections of differing radii, joined tangentially. Alternatively, or in addition, the composite stringer of the present disclosure may be configured to follow a stringer path that corresponds to a complex curve, where the curve cannot be contained within a two-dimensional plane, but extends into three dimensions.

Figure 3:
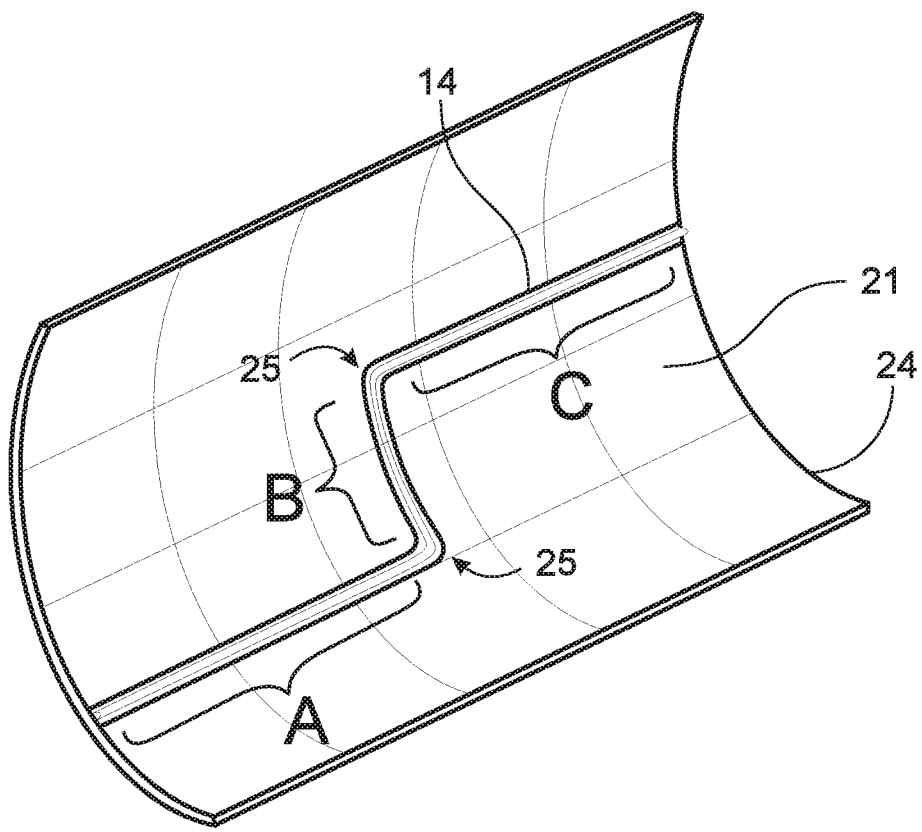
FIG. 3 semi-schematically depicts an illustrative example of a rounded-hat composite stringer coupled to the inner side of a fuselage skin panel, where the composite stringer traces a pathway that includes a complex curve.

For example, as shown in FIG. 3, rounded-hat composite stringer 14 extends along surface 21 of skin portion 24, where skin portion 24 exhibits an overall curve, such as may be present in panels for the fuselage of an aircraft. While portions A and C of stringer 14 extend linearly along surface 21, stringer 14 jogs to one side along skin portion 24. As a result, in addition to the two opposing curves 25 forming the jog, portion B of stringer 14 necessarily also follows the curve of surface 21 of skin portion 24, and therefore defines a complex curved path for conduit axis 46. The conduit path followed by stringer 14 of FIG. 3 cannot be defined within a two-dimensional plane.

Any given portion of a composite stringer 14 according to the present disclosure may incorporate one or more curving portions, and may include one or more curves that may be any combination of simple, compound, or complex curves. Composite stringer 14 can follow a pathway that includes any necessary joggles and/or curved portions so as to accommodate any local variations in skin portion 24, skin ramps, and/or lap joints at the junction of individual sections of skin portion 24 sections.

Figure 4:
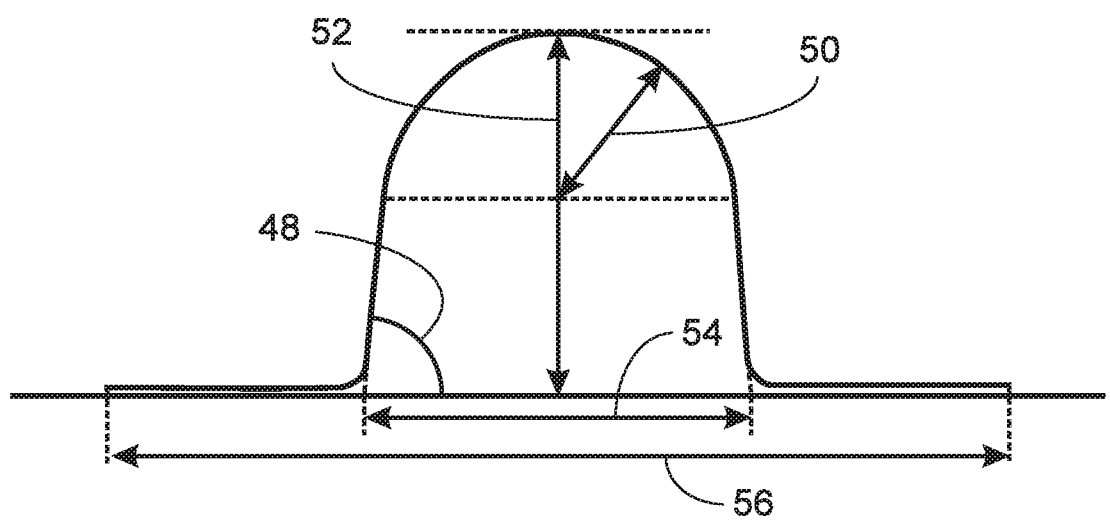
FIG. 4 is a schematic depiction of the geometry of the rounded-hat composite stringer of FIG. 2.

FIG. 4 depicts a simplified cross-section of the stringers of the present disclosure. As shown, sidewall 30 of stringer 14 can form an acute angle with surface 21 of base 22, forming a curved fillet portion. Typically, sidewall 30 forms an angle of between 90 degrees and 45 degrees. In another aspect of the disclosure, sidewall 30 forms a sidewall angle 48 of at least 70 degrees with surface 21 of base 22.

The cross-section of the disclosed stringers 14 may additionally be characterized as having a cap radius 50 (i.e. the radius of rounded-hat portion 32). In one aspect of the present disclosure, cap radius 50 has a value of between 0.5 inches (13 mm) and 1.5 inches (38 mm).

The cross-section of the disclosed stringers 14 may additionally or alternatively be characterized as having a hat height 52 of the rounded-hat portion 32 of the stringer, as well as a hat width 54, and a stringer width 56. Each of hat height 52 and hat width 54 can have a value between 1.5 inches (38 mm) and 3.5 inches (89 mm). In some aspects of the present disclosure, stringers 14 can be characterized as having a hat height 52 to hat width 54 ratio of at least 0.5. In another aspect of the present disclosure, stringers 14 can be characterized as having a hat height 52 to hat width 54 ratio of at least 1.0. Alternatively, or in addition, the cross-section of the disclosed stringers 14 may be characterized as having a hat width 54 to a stringer width 56 ratio of less than 0.5.

Method of Manufacture

The composite stringers of the present disclosure can be manufactured by shaping one or more plies of composite material to form a composite charge, placing the composite charge in a forming press, and using an appropriate form or forms to shape the composite charge into a stringer precursor that exhibits the desired rounded-hat profile as well as the desired three-dimensional contour. A forming member, such as a mandrel or bladder can be placed within the rounded-hat profile to maintain the desired profile, and the stringer precursor can then be consolidated with a surface such as an inner side of a skin portion by the application of one or more of pressure and temperature to cure the composite material and consolidate the cured composite material with the skin portion. Upon removal of the forming remember, the result is a rounded-hat composite stringer of the disclosure.

The process of manufacturing composite material stringers, and detailed descriptions of apparatus for forming composite material stringers, have been previously disclosed, for example by U.S. Pat. No. 8,465,613 to Rotter et al., U.S. Pat. No. 9,561,602 to Jones et al., and U.S. Pat. No. 9,649,817 to Robins et al., each of which is hereby incorporated by reference in its entirety for any and all purposes.

Figure 5:
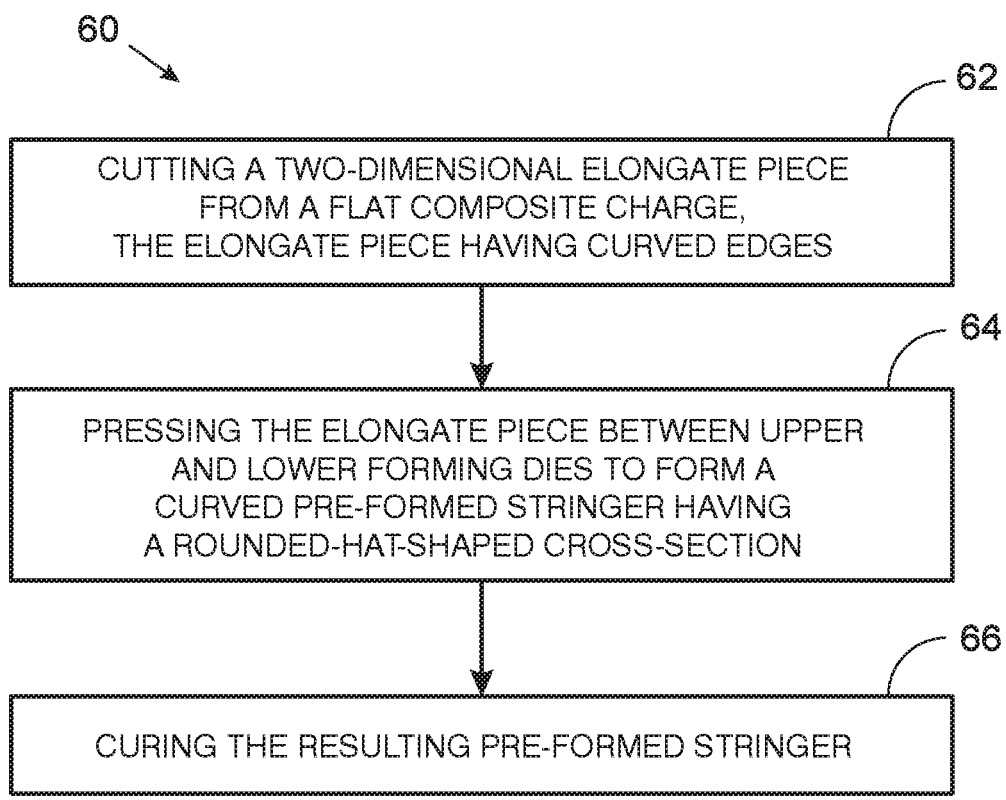
FIG. 5 is a flowchart depicting an illustrative method of manufacturing a complex-contoured rounded-hat composite stringer, according to an aspect of the present disclosure.

An illustrative method of manufacturing a complex-contoured rounded-hat composite stringer is described by flowchart 60 of FIG. 5, which includes cutting a two-dimensional elongate piece from a flat composite charge, where the elongate piece has curved edges, at step 62 of flowchart 60; pressing the elongate piece between upper and lower forming dies to form a curved pre-formed stringer having a rounded-hat-shaped cross-section, at step 64 of flowchart 60; and curing the resulting pre-formed stringer, at step 66 of flowchart 60.

Figure 6:
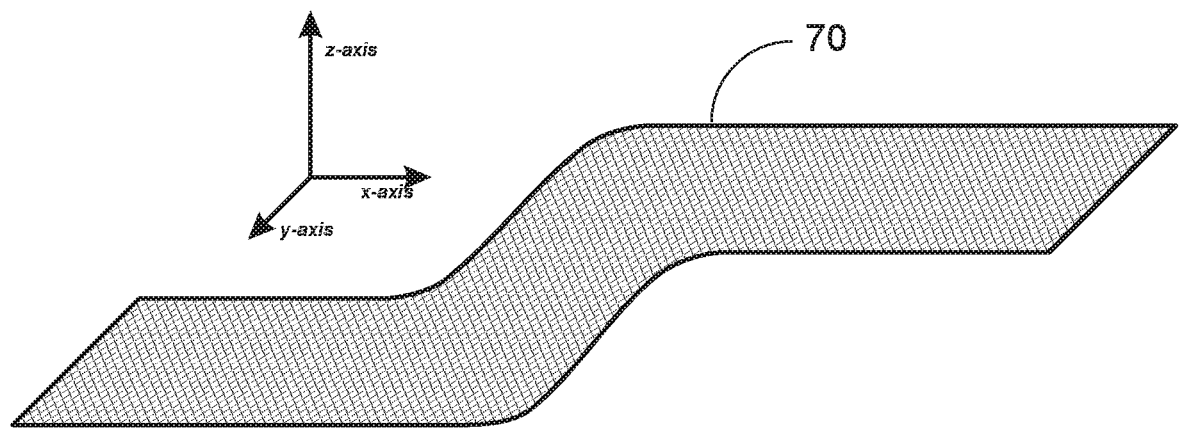
FIG. 6 depicts a prepared flat composite charge incorporating a flat curve and configured to form a rounded-hat composite stringer, according to an aspect of the present disclosure.

A flat composite charge 70 is depicted in FIG. 6. Composite charge 70 can include a composite prepreg material that is not fully cured, and may incorporate one or more plies of a selected composite material, where the plies that may be the same or different. Typically, composite charge 70 includes a carbon fiber reinforcing fabric and/or tape saturated with an appropriate epoxy resin or other matrix material.

As shown in FIG. 6, composite charge 70 of FIG. 6 is flat, and is shown aligned horizontal within or parallel to the x-y plane. However, the outline of composite charge 70 is typically cut to at least substantially reflect the desired contour of the final stringer with respect to the x-y plane. That is, the desired stringer contour in three-dimensions is converted into a flat outline by ignoring the position of the desired stringer contour along the z-axis. Put another way, the outline of composite charge 70 may correspond substantially to the projection of the desired three-dimensional stringer contour onto the x-y plane. In this manner, composite charge 70 is cut so as to already incorporate the components of any desired curves that lie in the x-y-plane. The formation of curve components that extend along the z-axis can then be formed during pressing.

Figure 7:
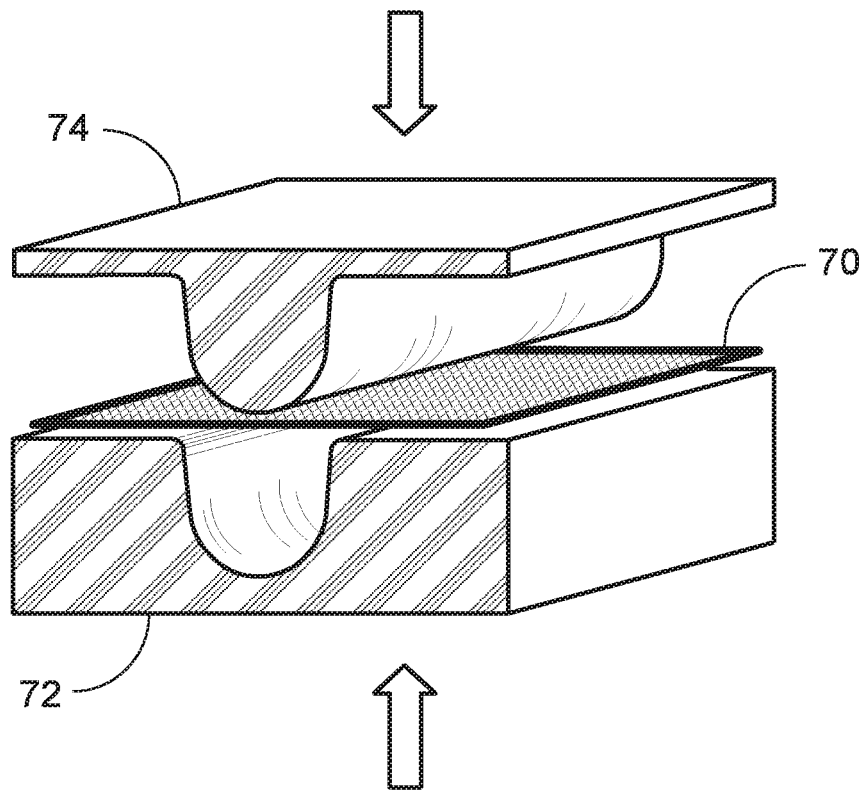
FIG. 7 semi-schematically depicts the flat composite charge of FIG. 6 being pressed between a lower forming die and an upper forming die to form a rounded-hat composite stringer, according to an aspect of the present disclosure.

Contoured composite charge 70 can then be positioned between a lower forming die 72 and an upper forming die 74, as shown in FIG. 7 for a representative short segment of composite charge 70, and dies 72 and 74. Lower forming die 72 and upper forming die 74 are shaped appropriately that pressing flat composite charge 70 between dies 72 and 74 shapes composite charge 70 into a pre-formed stringer 14 that incorporates the desired cross-sectional profile. That is, the dies 72 and 74 are shaped to produce a pre-formed stringer 14 that incorporates the rounded-hat profile discussed previously and shown in FIGS. 2 and 4. In particular, the resulting pre-formed stringer 14 has an inner side between curved fillet portions that defines desired central ridge 28 of stringer 14.

In one aspect of the present disclosure, rather than being manufactured to form a specific stringer contour, lower forming die 72 and upper forming die 74 are prepared from elastomeric materials, so that the dies themselves exhibit sufficient flexibility to define the desired stringer contour in three dimensions. Such elastomeric forming dies can be subsequently reshaped and reused manufacture a different stringer having a different shape. That is, the use of elastomeric forming dies permits the creation of a variety of stringers having individual customized contours in three dimensions, conserving materials and simplifying manufacturing.

As discussed above, the shape of composite charge 70 with respect to the x-y plane is established by cutting the composite charge appropriately. While the forming dies shape the profile of composite charge 70 to match a desired cross-sectional profile, the lower forming die 72 and upper forming die 74 when placed in an appropriate forming press can additionally shape composite charge 70 to incorporate a desired contour along the z-axis.

Figure 8:
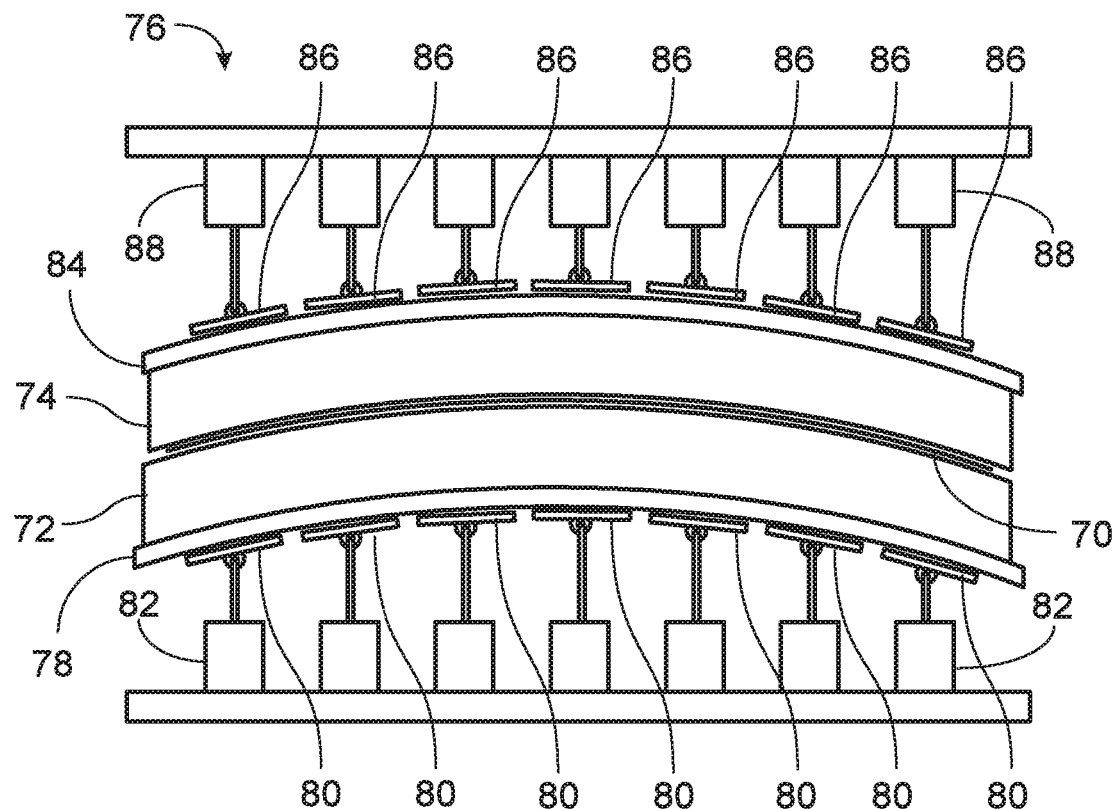
FIG. 8 semi-schematically depicts the flat composite charge of FIG. 6 between a lower forming die and an upper forming die, while being shaped within a forming press to form a rounded-hat stringer having a complex curve, according to an aspect of the present disclosure.

Forming presses capable of forming a substantially flat composite charge into a fully contoured part are described in detail in U.S. Pat. No. 9,561,602. An appropriate forming press 76 can mount elastomeric dies such as lower forming die 72 and upper forming die 74 so that individual segments of each die are independently displaceable relative to each other, as shown semi-schematically in FIG. 8. Using forming press 76, lower forming die 72 can be supported by a flexible die tray 78 that is in turn coupled to a set of lower anvils 80. A set of contour control actuators 82 can be used to sequentially position lower anvils 80 so as to shape lower forming die 72 to achieve the desired stringer contour in three dimensions.

As lower forming die 72 is gradually shaped by anvils 80, upper forming die 74 can be mounted on a backing plate 84, and can similarly be displaced sequentially via upper anvils 86 and actuators 88. Forming press 76 can be controlled by a programmed controller which is configured to individually and gradually displace the lower and upper anvils 80, 86 so as to incrementally form the flat composite charge 70 between lower forming die 72 and upper forming die 74 in a manner that reduces or eliminates wrinkles in the formed stringer. When positioned appropriately, lower forming die 72 and upper forming die 74, in combination, form composite charge 70 to follow a desired stringer contour. That is, each of the upper and lower forming dies has a first curvature around a first axis and a second curvature around a second axis, the first and second axes being orthogonal to each other and distinct from the longitudinal axis of the upper and lower forming dies.

Figure 9:
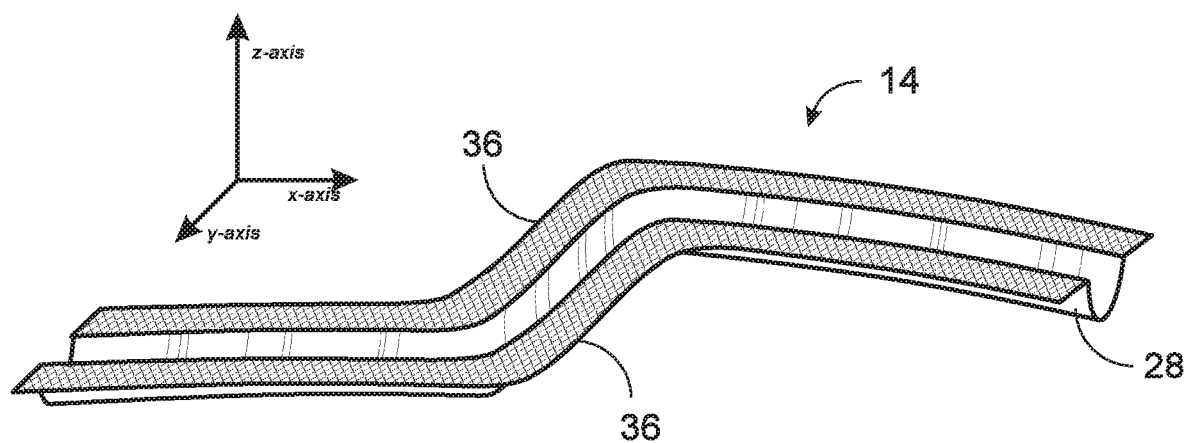
FIG. 9 semi-schematically depicts a rounded-hat composite stringer formed by the pressing operation of FIG. 8, incorporating a complex curve, according to an aspect of the present disclosure.

Once shaped by forming press 76 the resulting pre-formed stringer 14, as shown in FIG. 9, exhibits a longitudinal central ridge 28 that includes sidewalls 30, and rounded hat portion 32, as well as lateral legs 36 on each side of central ridge 28. Stringer 14 additionally incorporates the desired degree and pattern of curvature around a vertical axis (z-axis), but in addition incorporates the desired degree and pattern of curvature around either horizontal axis (x-axis, y-axis).

Figure 10:
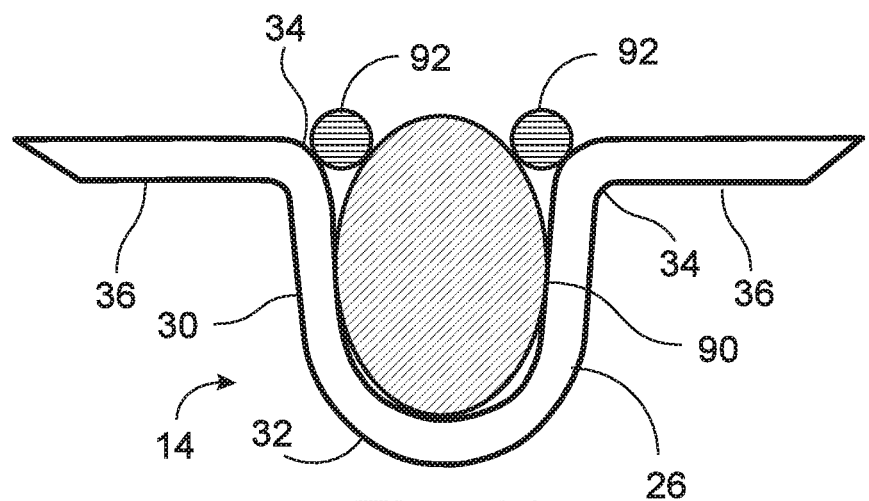
FIG. 10 semi-schematically depicts the combination of a forming member and radius fillers to the curved fillet portions of the rounded-hat stringer of FIG. 9, according to an aspect of the present disclosure.

Pre-formed stringer 14 can be prepared for attachment to base 22 by contacting a forming member 90 against the inner side of the pre-formed stringer, i.e. along and substantially within the interior of central ridge 28, as shown in FIG. 10. Forming member 90 can be a flexible elongated mandrel, elongated inflatable bladder, or any other suitable space-filling material configured to preserve the shape and configuration of central ridge 28 and therefore stringer 14 during curing.

In an alternative aspect of the present disclosure, before forming member 90 is positioning against the inner side of the pre-formed stringer, forming member 90 can be pre-wrapped with a polymeric film, such as a thermoset plastic or thermoplastic film. Forming member 90 can be wrapped with such a film in any suitable pattern, or patterns, for example in a helical pattern or, where two film strips are used, in opposing helical patterns. Pre-wrapping the forming member in this way can result in consolidation of the resulting inner laminate layer with the stringer shell, and in particular, helps associate stringer 14 with base 22, improving structural performance and improving fuel flow through conduit 40.

Once forming member 90 is in place, elongate radius fillers 92 are applied adjacent to forming member 90 and abutting curve 34 of the pre-formed stringer. Radius filler (or noodle) 92 serves to fill the space between curve 34 and surface 21 of base 22 when stringer 14 is installed, and create a smooth continuous inner surface for resulting conduit 40. Radius filler 92 therefore should be reversibly or irreversibly deformable under pressure, such as for example a thermoset plastic, or thermoplastic, among others. The radius filler optionally can include one or more reinforcing fibers or threads, such as carbon fibers, polymer fibers, or other reinforcing materials to provide strength and resilience.

Figure 11:
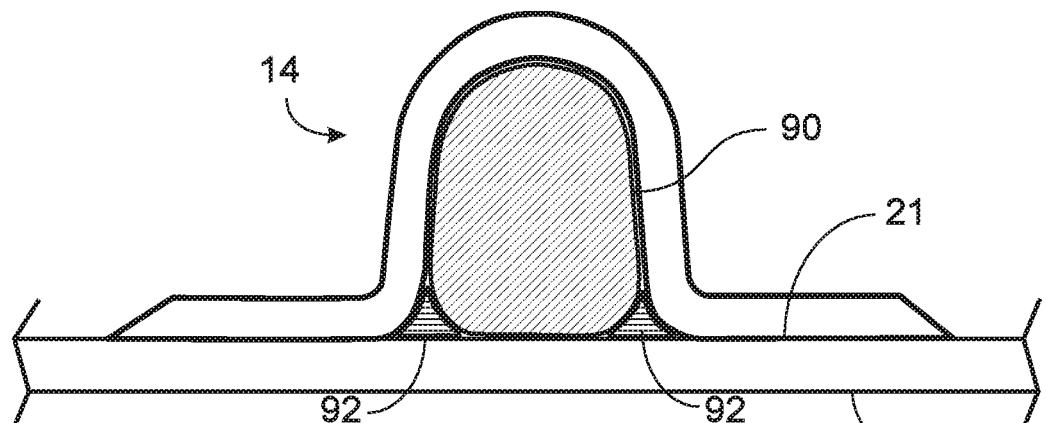
FIG. 11 semi-schematically depicts the rounded-hat stringer assembly of FIG. 10 in combination with a base, according to an aspect of the present disclosure.

Once forming member 90 and radius fillers 92 are appropriately positioned, the resulting assembly 94 can be associated with a base 22 and consolidated by curing, as shown in FIG. 11. Base 22 can include a composite charge that extends along and consolidates with stringer 14, forming an integral and unitary stringer that defines inner conduit 40. Alternatively, base 22 can include skin portion 24, where stringer 14 is associated with surface 21 of skin portion 24 and cured in place. Alternatively, stringer 14 can be formed with a base 22 that is an elongate composite charge, and the integral resulting stringer 14 can in turn be associated with a skin portion 24 of apparatus 10. In one aspect of the present disclosure, the curing of pre-formed stringer 14 is carried out with the pre-formed stringer disposed directly on a skin portion of an aircraft. In another aspect of the present disclosure, the curing of pre-formed stringer 14 is carried out with the pre-formed stringer disposed directly on a skin portion of an aircraft wing.

Figure 12:
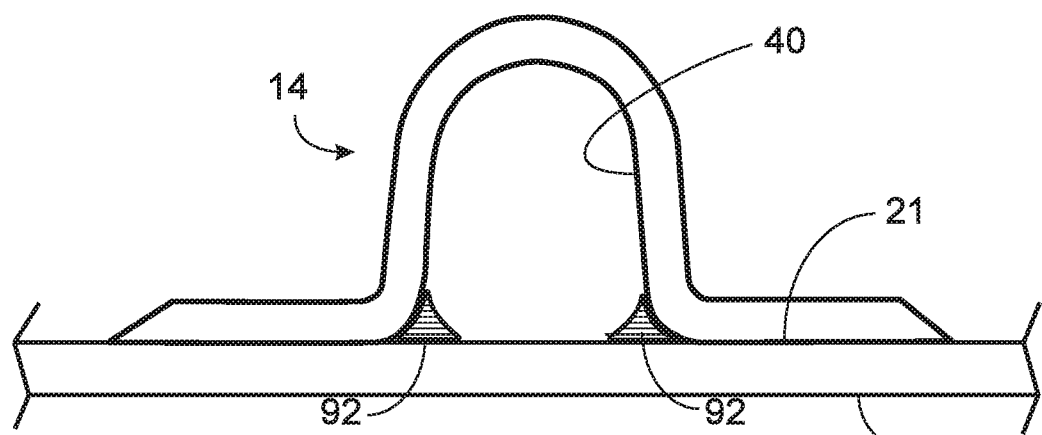
FIG. 12 semi-schematically depicts the cured rounded-hat stringer of FIG. 11 after the forming member has been removed, showing the formation of an internal conduit, according to an aspect of the present disclosure.

Once stringer 14 is appropriately cured, forming member 90 can be removed from the newly-formed elongate internal conduit 40, leaving radius fillers 92 in place, as shown in FIG. 12.

The method described by flowchart 60 of FIG. 5 can be described alternatively by reciting in greater detail a series of individual manufacturing steps as performed during the manufacture, or lay-up, of an illustrative rounded-hat composite stringer 14 as presently disclosed. This series of manufacturing steps can begin with preparing a stack of the desired number of layers, or plies, of the desired sheets of reinforcing material and impregnating the reinforcing material with the desired resin. Alternatively or in addition, a stack of sheets of prepreg composite material can be assembled. This full ply stack of composite sheets can then be trimmed so that the stack incorporates the desired curves along the plane of the flat stack. The contoured stack, or charge, can then be placed in a forming press, such as a punch former, that incorporates upper and lower forming dies. Placing the trimmed composite charge in the punch former can include indexing the charge for more accurate positioning of the charge with respect to the punch former and/or the forming dies. The punch former can then be adjusted so that the appropriate cross-sectional profile is formed in the charge, and also so that the charge is oriented into the desired three-dimensional contour, specifically by imposing the desired curvature on the composite charge along the vertical z-axis. Once the charge has been shaped into the appropriate contour, including shaping the central ridge, the charge is heated to a sufficient temperature to soften the composite material for forming, and the punch former applies pressure to the charge. Pressure is typically also applied to the sides of the charge. The shaped composite charge is then allowed to cool.

A mandrel (or forming body) can then be placed within the central ridge of the cooled and shaped pre-formed stringer. Noodles, or elongate radius fillers, can be installed alongside the mandrel, and the resulting stringer assembly can be compacted by a press. The compacted stringer assembly can then be transferred to a surface of a skin portion where the stringer is to be installed, and positioned on the skin as desired. The stringer assembly can then be bagged and autoclaved to fully cure the composite materials of the stringer in place to consolidate the stringer to the skin, permanently attaching it in place.

Figure 13:
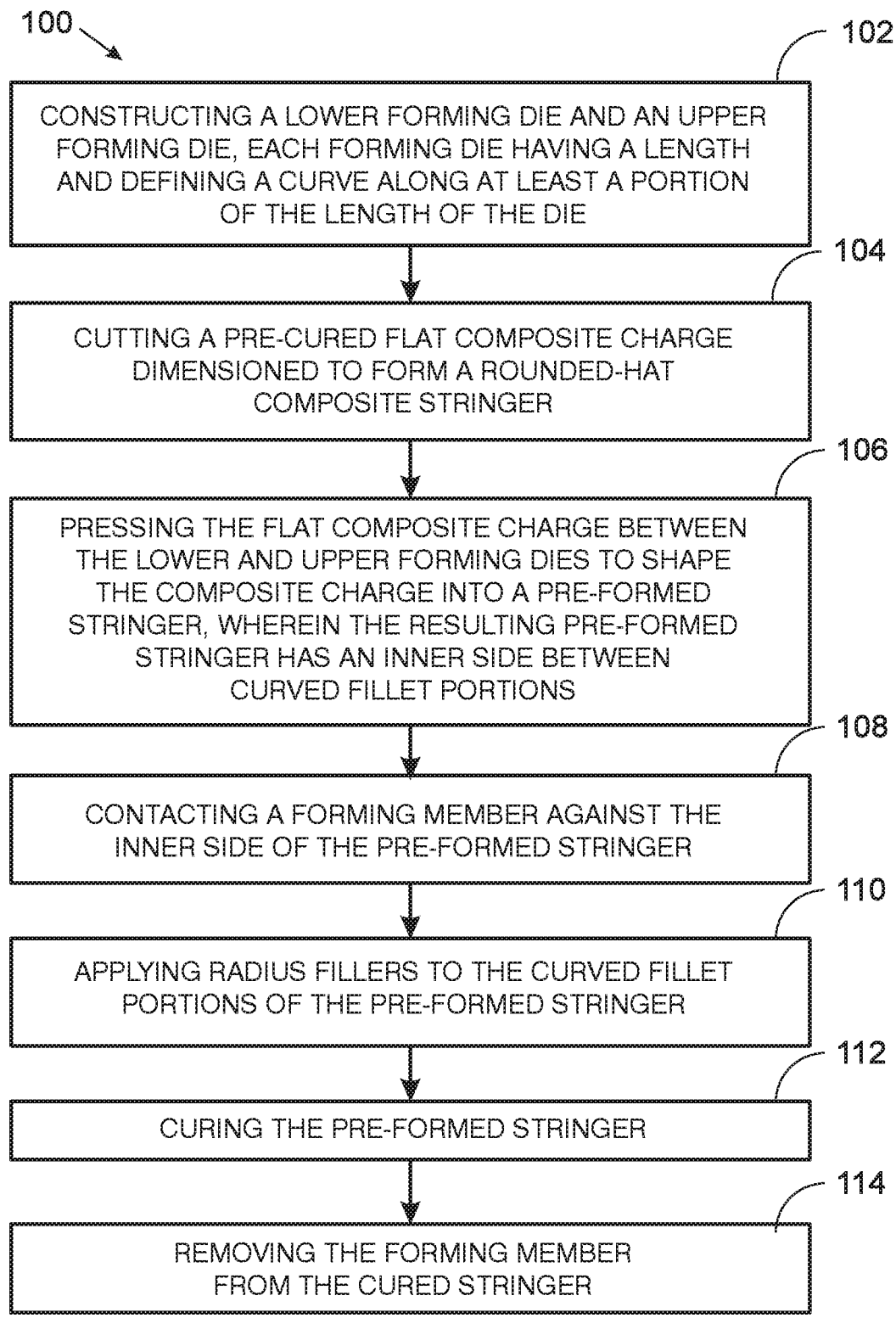
FIG. 13 is a flowchart for a representative method of manufacturing a rounded-hat composite stringer according to an aspect of the present disclosure.

Another illustrative method of manufacturing a rounded-hat composite stringer is additionally described by flowchart 100 of FIG. 13. The illustrative method includes constructing a lower forming die and an upper forming die, each forming die having a length and defining a curve along at least a portion of the length of the die, as set out at step 102 of flowchart 100; cutting a pre-cured flat composite charge dimensioned to form a rounded-hat composite stringer, as set out at step 104 of flowchart 100; pressing the flat composite charge between the lower and upper forming dies to shape the composite charge into a pre-formed stringer, wherein the resulting pre-formed stringer has an inner side between curved fillet portions, as set out at step 106 of flowchart 100; contacting a forming member against the inner side of the pre-formed stringer, at step 108 of flowchart 100; applying radius fillers to the curved fillet portions of the pre-formed stringer, at step 110 of flowchart 100; curing the pre-formed stringer, at step 112 of flowchart 100; and removing the forming member from the cured stringer, at step 114 of flowchart 100.

Examples, Components, and Alternatives

The following numbered paragraphs describe selected aspects of the disclosed rounded-hat composite stringers and methods of manufacturing rounded-hat composite stringers. The examples in these sections are intended for illustration and should not be interpreted as limiting the entire scope of the present disclosure. Each section may include one or more distinct embodiments or examples, and/or contextual or related information, function, and/or structure.

A1. An aircraft, comprising:
a skin portion having an inner side, and
a rounded-hat composite stringer connected to the inner side of the skin portion, that in combination with the skin portion forms an elongate conduit having a conduit axis; wherein the conduit axis includes at least one curving portion.

A2. The aircraft of paragraph A1, where the conduit axis includes at least one portion tracing a complex curve.

A3. The aircraft of paragraph A1, where the skin portion is on a wing, a fuselage, or an empennage of the aircraft.

A4. The aircraft of paragraph A1, where the stringer has a cross-section characterized by a hat height to hat width ratio of at least 0.5.

A5. The aircraft of paragraph A1, where the stringer has a cross-section characterized by a hat height to hat width ratio of at least 1.0.

A6. The aircraft of paragraph A5, wherein each of the hat height and the hat width has a value between 1.5 inches and 3.5 inches.

A7. The aircraft of paragraph A1, where a side wall of the stringer forms an angle of at least seventy degrees with the inner side of the skin portion.

A8. The aircraft of paragraph A1, where the stringer has a cross-section characterized by a cap radius of between 0.5 inch and 1.5 inches.

A9. The aircraft of paragraph A1, where the stringer has a cross-section characterized by a hat width to stringer width ratio of less than 0.5.

B1. A method of manufacturing a rounded-hat composite stringer, comprising:
constructing a lower forming die and an upper forming die, each forming die having a length and defining a curve along at least a portion of the length of the die;
cutting a pre-cured flat composite charge dimensioned to form a rounded-hat composite stringer;
pressing the flat composite charge between the lower and upper forming dies to shape the composite charge into a pre-formed stringer, wherein the resulting pre-formed stringer has an inner side between curved fillet portions;
contacting a forming member against the inner side of the pre-formed stringer;
applying radius fillers to the curved fillet portions of the pre-formed stringer; and
curing the pre-formed stringer; and
removing the forming member from the cured stringer.

B2. The method of paragraph B1, where each of the upper and lower forming dies incorporates a complex curve.

B3. The method of paragraph B1, where the pre-formed stringer has a cross-section characterized by a hat height to hat width ratio of at least 0.5.

B4. The method of paragraph B1, where the pre-formed stringer has a cross-section having a base plane and a side wall, where the side wall forms an angle of at least seventy degrees with the base plane of the pre-formed stringer.

B5. The method of paragraph B1, where the pre-formed stringer has a cross-section characterized by a cap radius of between 0.5 inches to 1.5 inches.

B6. The method of paragraph B1, where cutting the pre-cured flat composite charge includes forming at least one curved border on the pre-cured flat composite charge.

B7. The method of paragraph B1, where curing the pre-formed stringer is carried out with the pre-formed stringer disposed directly on a wing skin.

B8. The method of paragraph B1, where the forming dies are comprised of an
elastomeric material, further comprising:
reshaping the upper and lower forming dies into different shapes for use in subsequently manufacturing a different stringer having a different shape.

C1. A method of manufacturing a complex-contoured rounded-hat composite stringer, comprising:

cutting a two-dimensional elongate piece from a flat composite charge, the elongate piece having at least two curved edges, pressing the elongate piece between upper and lower forming dies to form a curved pre-formed stringer having a rounded-hat-shaped cross-section, and curing the resulting pre-formed stringer.

C2. The method of paragraph C1, where the rounded-hat-shaped cross-section is characterized by a hat height to hat width ratio of at least 0.5.

C3. The method of paragraph C2, where each of the upper and lower forming dies has a first curvature around a first axis and a second curvature around a second axis, the first and second axes being orthogonal to each other and distinct from a longitudinal axis of the upper and lower forming dies.

C4. The method of paragraph C1, wherein the pre-formed stringer has an inner side between curved fillet portions, further comprising:

contacting a forming member against the inner side of the pre-formed stringer, and applying radius fillers to the curved fillet portions of the pre-formed stringer prior to curing the pre-formed stringer.

C5. The method of paragraph C1, wherein the upper and lower forming dies comprise an elastomeric material, the method further comprising reshaping the upper and lower forming dies for use in subsequently manufacturing a different stringer having a different complex-contoured shape.

Advantages, Features, Benefits

The different embodiments and examples of the apparatus and methods described herein provide several advantages over earlier stringer implementations.

The rounded-hat composite stingers of the present disclosure can be formed to follow curved, compound curved, and/or complex curved pathways from a composite laminate charge.

They presently disclosed stringers can be manufactured at the same facility and/or location where aircraft assembly is performed.

They presently disclosed stringers can be manufactured using reconfigurable tooling, decreasing production costs and increasing production rates.

The rounded-hat profiles of the presently disclosed stringers help resist Compression After Impact (CAI) damage, as well as Barely Visible Impact Damage (BVID), or damage suffered by composite materials due to low-velocity impacts that is typically not readily detectably by visual inspection, but that can result in internal structural damage (delamination, matrix cracking, fiber fracture, and fiber pullout, among others). The presently disclosed stringers are less prone to failure due to BVID than conventional trapezoid-hat stringer, which are susceptible to impacts having lower energies, and which suffer larger damage areas along their flat surfaces. The stringers of the present disclosure can withstand higher compressive loads than conventional stringers even after BVID, and due to the rounded-hat profile, the disclosed stringers provide a consistent resistance to impact damage regardless of the angle of impact on the upper rounded portion of the stringer.

The presently disclosed stringers provide better liquid flow via the internal conduit. In particular, the rounded geometry of the conduit helps create better and less turbulent fuel flow through the stringer, compared to conventional trapezoidal-hat shaped stringers.

Stringers may be constructed with radius fillers positioned at the intersection of the flange to web. These radius fillers can be made from multiple thermoset/composite fiber combinations, as well as a thermoplastic/fiber combinations, and the radius fillers can be extruded and installed via make-on-assembly (phantom assembly) processes.

Make-on-assembly stringer construction processes can include pre-wrapping the forming body with a thermoset plastic or thermoplastic material. In doing so, the resulting continuous inner laminate layer helps tie the stringer body to the base upon curing. In addition, the inner laminate additionally improves fuel flow and overall structural performance.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of manufacturing a composite stringer, comprising:

constructing a lower forming die and an upper forming die, each forming die having a length and defining a curve along at least a portion of the length of the die;

cutting a pre-cured flat composite charge dimensioned to form a composite stringer;

pressing the flat composite charge between the lower and upper forming dies to shape the composite charge into a pre-formed stringer;

contacting a forming member against the inner side of the pre-formed stringer;

curing the pre-formed stringer;

removing the forming member from the cured stringer; and reshaping the upper and lower forming dies into different shapes for use in subsequently manufacturing a different stringer having a different shape;

wherein the forming dies are comprised of an elastomeric material.

2. The method of claim 1, wherein each of the upper and lower forming dies incorporates a complex curve.

3. The method of claim 1, wherein the pre-formed stringer has a cross-section characterized by a hat height to hat width ratio of at least 0.5.

4. The method of claim 1, wherein the pre-formed stringer has a cross-section having a base plane and a side wall, where the side wall forms an angle of at least seventy degrees with the base plane of the pre-formed stringer.

5. The method of claim 1, wherein the pre-formed stringer has a cross-section characterized by a cap radius of between 0.5 inches to 1.5 inches.

6. The method of claim 1, wherein cutting the pre-cured flat composite charge includes forming at least one curved border on the pre-cured flat composite charge.

7. The method of claim 1, wherein curing the pre-formed stringer is carried out with the pre-formed stringer disposed directly on a wing skin.

8. A method of manufacturing a complex-contoured composite stringer, comprising:
cutting a two-dimensional elongate piece from a flat composite charge,
pressing the elongate piece between upper and lower forming dies to form a curved pre-formed stringer, and
curing the resulting pre-formed stringer;
wherein each of the upper and lower forming dies has a first curvature around a first axis and a second curvature around a second axis, the first and second axes being orthogonal to each other and distinct from a longitudinal axis of the upper and lower forming dies.

9. The method of claim 8, wherein the pre-formed stringer has an inner side between curved fillet portions, further comprising:
contacting a forming member against the inner side of the pre-formed stringer, and applying radius fillers to the curved fillet portions of the pre-formed stringer prior to curing the pre-formed stringer.

10. The method of claim 1, wherein the resulting pre-formed stringer has an inner side between curved fillet portions, further comprising:
applying radius fillers to the curved fillet portions of the pre-formed stringer.

11. The method of claim 8, wherein the two-dimensional elongate piece has at least two curved edges.

12. The method of claim 8, wherein the curved pre-formed stringer has a rounded-hat-shaped cross-section.

13. A method of manufacturing a rounded-hat composite stringer, comprising:
constructing a lower forming die and an upper forming die, each forming die having a length and defining a curve along at least a portion of the length of the die;
cutting a pre-cured flat composite charge dimensioned to form a rounded-hat composite stringer;
pressing the flat composite charge between the lower and upper forming dies to shape the composite charge into a pre-formed stringer,
wherein the pre-formed stringer has a rounded cap supported by straight sidewalls, the rounded cap being continuously curved between the straight sidewalls, and
wherein each of the upper and lower forming dies has a first curvature around a first axis and a second curvature around a second axis, the first and second axes being orthogonal to each other and distinct from a longitudinal axis of the upper and lower forming dies.

14. The method of claim 13, wherein the resulting pre-formed stringer has an inner side between curved fillet portions, further comprising:
contacting a forming member against the inner side of the pre-formed stringer;
applying radius fillers to the curved fillet portions of the pre-formed stringer;
curing the pre-formed stringer; and
removing the forming member from the cured stringer.

15. The method of claim 14, wherein curing the pre-formed stringer is carried out with the pre-formed stringer disposed directly on a base, and the cured stringer and the base form an internal conduit suitable for the transport of fluids.

16. The method of claim 13, wherein each of the upper and lower forming dies incorporates a complex curve.

17. The method of claim 13, wherein the rounded cap transitions to each straight sidewall at a tangent point.

18. The method of claim 13, wherein the rounded cap has a single continuous curve.

19. The method of claim 13, wherein the rounded cap has simple curvature.

20. The method of claim 19, wherein the rounded cap has a fixed radius.

* * * * *